(12) United States Patent
Chappell et al.

(10) Patent No.: US 9,350,986 B2
(45) Date of Patent: May 24, 2016

(54) DUAL-PORT TESTING OF A CABLE NETWORK

(71) Applicant: Viavi Solutions Inc., Milpitas, CA (US)

(72) Inventors: Daniel K. Chappell, Greenwood, IN (US); Richard Earl Jones, Jr., Plainfield, IN (US); David W. Jones, Pittsboro, IN (US); Adam D. Gray, Avon, IN (US)

(73) Assignee: Viavi Solutions Inc., Milpitas, CA (US)

( * ) Notice: Subject to any disclaimer, the term of this patent is extended or adjusted under 35 U.S.C. 154(b) by 0 days.

(21) Appl. No.: 14/327,589

(22) Filed: Jul. 10, 2014

(65) Prior Publication Data

US 2015/0020129 A1 Jan. 15, 2015

Related U.S. Application Data

(60) Provisional application No. 61/845,751, filed on Jul. 12, 2013.

(51) Int. Cl.
*H04N 7/173* (2011.01)
*H04N 17/00* (2006.01)
*H04N 21/633* (2011.01)

(52) U.S. Cl.
CPC ......... *H04N 17/004* (2013.01); *H04N 7/17309* (2013.01); *H04N 21/633* (2013.01)

(58) Field of Classification Search
USPC .............................. 725/9–10, 12, 14, 34, 107
See application file for complete search history.

(56) References Cited

U.S. PATENT DOCUMENTS

| | | | |
|---|---|---|---|
| 5,142,690 A | 8/1992 | McMullan, Jr. et al. | 725/124 |
| 6,061,393 A | 5/2000 | Tsui et al. | 375/224 |
| 6,233,274 B1 | 5/2001 | Tsui et al. | 375/227 |
| 6,385,237 B1 | 5/2002 | Tsui et al. | 375/228 |
| 6,961,370 B2 | 11/2005 | Chappell | 375/224 |
| 2008/0320541 A1 | 12/2008 | Zinevich | 725/127 |
| 2013/0204555 A1* | 8/2013 | Scheushner et al. | 702/59 |
| 2014/0165126 A1* | 6/2014 | Zinevich | 725/129 |

* cited by examiner

*Primary Examiner* — Pankaj Kumar
*Assistant Examiner* — Charles N Hicks
(74) *Attorney, Agent, or Firm* — Harrity & Harrity, LLP

(57) ABSTRACT

A dual-port testing apparatus is provided for testing a cable network at two test points. The testing may comprise demodulation of a same data packet at the test points, decoding the data packet, performing spectral analysis of the signal, etc. Testing results may be correlated with one another, both visually and by using pre-defined test metrics comprising a weighted sum of demodulation and decoding parameters such as modulation extinction ratio and a codeword error.

20 Claims, 12 Drawing Sheets

DUAL-PORT TESTING OF A CABLE NETWORK

CROSS-REFERENCE TO RELATED APPLICATIONS

The present invention claims priority from U.S. Patent Application No. 61/845,751, filed Jul. 12, 2013, entitled "Dual Cable Network Analyzer," which is incorporated herein by reference.

TECHNICAL FIELD

The present invention relates to cable networks, and in particular, to equipment and methods for testing cable networks.

BACKGROUND

A cable network delivers services such as digital television, Internet, and Voice-over-IP (VoIP) phone service. A cable network has a controlling center or "head end", which controls video and data traffic in the network by generating or distributing video and data signals. The signals are delivered over a tree-like network of a broadband coaxial cable termed "cable plant". Digital television signals are broadcast from the headend to a trunk of the cable plant, and delivered to subscribers' homes connected to branches of the cable plant. In going from the headend to subscribers, the signals are split many times, and are attenuated in the process. Accordingly, a strong downstream broadcast signal is required, so that the signal level at the subscribers' premises is strong enough to be reliably detected. Upstream signals from the subscribers' homes carry phone and Internet traffic. The upstream signals propagate from the branches of the cable plant towards the headend of the network.

Upstream and downstream signals occupy separate frequency bands referred to as upstream and downstream frequency bands. Downstream information channel signals co-propagate in the downstream frequency band, and upstream signals co-propagate in the upstream frequency band. The frequency separation of the upstream and the downstream signals allows bidirectional amplification of these signals, which propagate in a common cable in opposite directions. In the United States, the upstream spectral band typically spans from 5 MHz to 42 MHz, while the downstream spectral band typically spans from 50 MHz to 860 MHz.

The upstream and downstream signals are prone to impairments and interference. Oxidized connectors may act as electrical diodes distorting the downstream signals by generating frequency harmonics, which may negatively impact both upstream and downstream signal paths. Aging equipment, such as signal boosters and amplifiers, may also distort the signals and add harmonics and "ringing" at unwanted frequencies. Another source of impairments is external electrical interference, termed "ingress noise". Despite electrical shielding of the cable, outside signals may find their way into, and become guided by the cable. Shielding punctures, especially at customers' premises, improper installation, interference from closely placed high-current electrical equipment, etc., all contribute to accumulation of ingress noise. Furthermore, a cable plant may act as a receiving radio antenna. Thanks to its large size, a cable plant may pick up signals from otherwise unlikely sources, such as aviation radars.

The impairment situation worsens as new customers are added to an existing cable network. The cable plant is extended by adding more splitters and connectors, amplifiers, and long runs of coaxial cable to new locations. When a cable plant is expanded, a probability of downstream and upstream signal impairments increases. Accordingly, growth of extent and functionality of cable based networks must be matched by a growing effort to assure quality of existing services via periodic testing and maintenance of the networks.

Tracing a source of impairment is a common task in cable network maintenance and troubleshooting. To find an origin of noise, a technician travels from node to node, measuring noise levels in various branches of the cable plant. In practice, a technician decides on the origin of noise by taking a noise level measurement on a common leg of a signal amplifier/splitter/combiner, and comparing the measured noise level to noise levels on individual legs, which are connected to branches of the cable plant. Once a "faulty" branch is identified, the technician consults a cable plant map, finds a location corresponding to termination of the faulty branch, travels to that location, and repeats the measurement.

In situations where a noise source cannot be easily identified, a technician may be tempted to quickly disconnect a suspect branch from a cable plant, to see if the noise disappears. Such practice, although allowing the technician to find impairments quicker, is generally discouraged by technician's supervisor, because it interrupts all data and television services to many customers. With cable companies always trying to improve data transfer reliability, purposefully removing service should be avoided.

Another time-consuming problem of cable network interference troubleshooting is related to intermittent character of many ingress noise sources. Noise related to bursts of defective or old cable modems may come at quasi-random periods of time. Furthermore, noise related to a transmission of a particular upstream channel may or may not impact that channel, leading to puzzling situations where a detectable noise does not impact a particular channel, while upstream packet errors appear on an apparently noise-free channel, due to the noise being somehow synchronized to the packet transmission, or occurring so rarely that a measured frequency spectrum of a cable network signal does not show an appreciable level of noise.

Zinevich in US Patent Application Publication 2008/0320541 discloses a system for locating an impairment in a cable network including a plurality of "encoders" placed throughout a cable network. The function of the encoders is to uniquely modulate the noise floor at locations where the encoders are installed. An "impairment detector" is placed at a headend of the cable network. The impairment detector is configured to identify noise location(s) by analyzing noise modulation properties. While the system of Zinevich enables remote identification of noise sources in a cable network, it requires installation of many encoders throughout the cable network, which may be costly. Furthermore, intermittent noise, and/or noise impacting only certain transmission channels, is not always detectable with Zinevich system.

In view of the foregoing, it may be understood that there may be significant problems and shortcomings associated with current solutions and technologies for testing cable networks.

SUMMARY

In accordance with an aspect of the invention, a dual-port testing apparatus is provided for simultaneous testing of a cable network at two test points. The results of testing may be correlated with one another, both visually and by using predefined test metrics. Preferably, a same data packet is captured, demodulated, and decoded at both test points, and results of demodulation and decoding compared to one another by implementing a test metrics derived from a weighted sum of the demodulation and decoding parameters.

In accordance with an aspect of the invention, there is provided an apparatus for testing a path of a network signal in a cable network, the path including first and second spaced apart test points, and the network signal including a first frequency channel including a first data packet, the apparatus comprising:

first and second RF input ports for coupling to the first and second test points, respectively, to obtain first and second signals, respectively, from the network signal propagating across the first and second test points; and a processor coupled to the first and second RF input ports, and configured for: down-converting the first and second signals to select the first frequency channel in each one of the first and second signals; demodulating the first frequency channel in each down-converted signal to select the first packet in each down-converted signal; and obtaining a first demodulation parameter of the first packet at each test point.

In one exemplary embodiment, the processor comprises first and second analog to digital converters coupled to the first and second RF input ports, respectively, for digitizing the first and second signals to obtain first and second digitized signals, respectively, and a clock coupled to the and second analog to digital converters, for synchronous clocking thereof. The processor may be configured for down-converting the first and second digitized signals to select the first frequency channel in each one of the first and second signals.

In accordance with the invention, there is further provided an apparatus for testing a path of a network signal in a cable network, the path including first and second spaced apart test points, the apparatus comprising:

first and second RF input ports for coupling to the first and second test points, respectively, to obtain first and second signals, respectively;

first and second analog to digital converters coupled to the first and second RF input ports, respectively, for synchronously digitizing the signal coupled to the first and second RF input ports, respectively, to obtain first and second digitized signals, respectively;

a processor for performing a spectral analysis of the first and second digitized signals, so as to obtain first and second frequency spectra; and a display device for displaying the first and second frequency spectra for a visual comparison.

In accordance with another aspect of the invention, there is further provided a method for testing a path of a network signal in a cable network, the path including first and second spaced apart test points, and the network signal including a first frequency channel including a first data packet, the method comprising:

(a) obtaining first and second signals from the network signal propagating across the first and second test points;

(b) down-converting the first and second signals to select the first frequency channel in each one of the first and second signals;

(c) demodulating the first frequency channel in each down-converted signal to select the first packet in each down-converted signal, and obtaining a first demodulation parameter of the first packet at each test point; and (d) displaying the first demodulation parameter corresponding to each test point.

In accordance with yet another aspect of the invention, there is further provided a method for testing a path of a network signal in a cable network, the path including first and second spaced apart test points, the method comprising:

(i) simultaneously sampling the network signal at the first and second test points, so as to obtain first and second digitized signals;

(ii) performing a spectral analysis of the first and second digitized signals, so as to obtain first and second spectra; and (iii) displaying the first and second spectra for a visual comparison.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
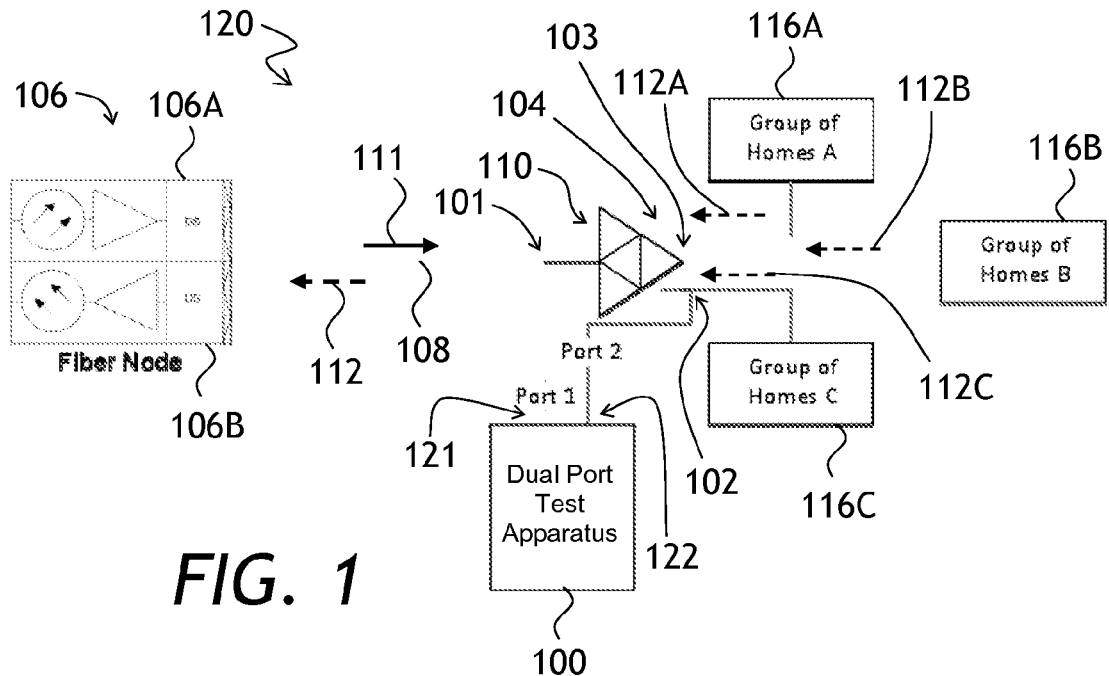
FIG. 1 illustrates an exemplary view of a cable network showing how a test instrument of the invention may be connected to a pair of test points in the network.

Referring to FIG. 1, an exemplary apparatus 100 for testing a path of a network signal in a cable network 120 may be connected to first 101 and second 102 spaced apart test points of the cable network 120. The cable network 120 may include a fiber node 106 including a downstream optoelectronic converter 106A and an upstream electro-optic converter 106B, coupled via a coaxial cable 108 to a bidirectional amplifier 110, which amplifies a downstream signal 111 for distribution to first, second, and third groups of homes 116A, 116B, and 116C, respectively. The groups of homes 116A, 116B, and 116C may send first, second, and third upstream signals 112A, 112B, and 113C, respectively, which may be combined by the bidirectional amplifier 110 into an upstream signal 112 propagating towards the fiber node 106.

The test apparatus 100 may have a first 121 and second 122 radio frequency (RF) input ports coupled to the first 101 and second 102 test points, respectively, of the cable network 120. If, for example, an ingress noise originates in the first group of homes 116A, then the ingress noise will be coupled to the first RF port 121 but not the second RF port 122. If an ingress noise originates in the third group of homes 116C, then the ingress noise will be coupled to the first RF port 121 and the second RF port 122. Accordingly, the source of noise may be located by keeping the first RF port 121 connected to the first test point 101, taking a combined measurement, reconnecting the second RF port 122 to third 103 and fourth 104 test points, taking another combined measurement, and so on.

Figure 2:
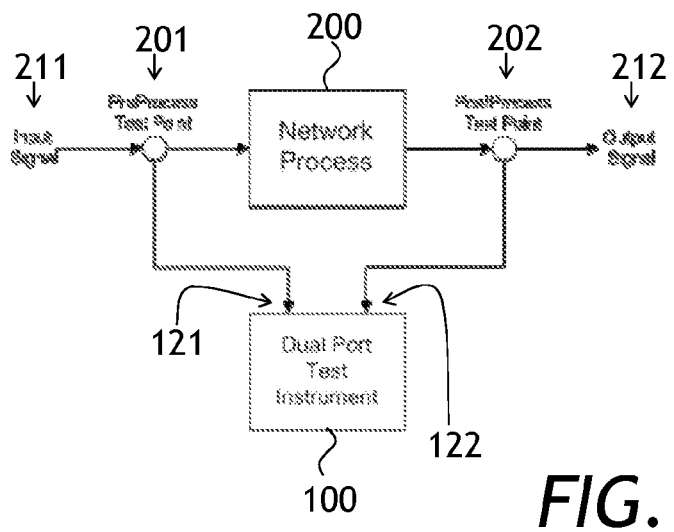
FIG. 2 illustrates an exemplary view of a network process being tested using the apparatus of FIG. 1.

A principle of fault location according to the invention is further illustrated in FIG. 2. A network process 200 may be tested by analyzing an input signal 211 of the network process 200 at a first "pre-process" test point 201 upstream of the network process 200, and at an output signal 212 of the network process 200 at a second "post-process" test point 202 downstream of the network process 200. The network process 200 may include amplification, combining, spitting, and so on. If the network process 200 introduces noise and/or other impairments into the output signal 212, noise levels and/or demodulation parameters obtained by the test apparatus 100 by processing electrical signals at the pre-process test point 201 and post-process test point 202 may be different; if not, the parameters may likely remain the same. Thus, a comparative measurement by the dual-port test instrument 100 at the two test points 201 and 202 may indicate whether the network process 200 introduces any noise or another impairment.

Figure 3:
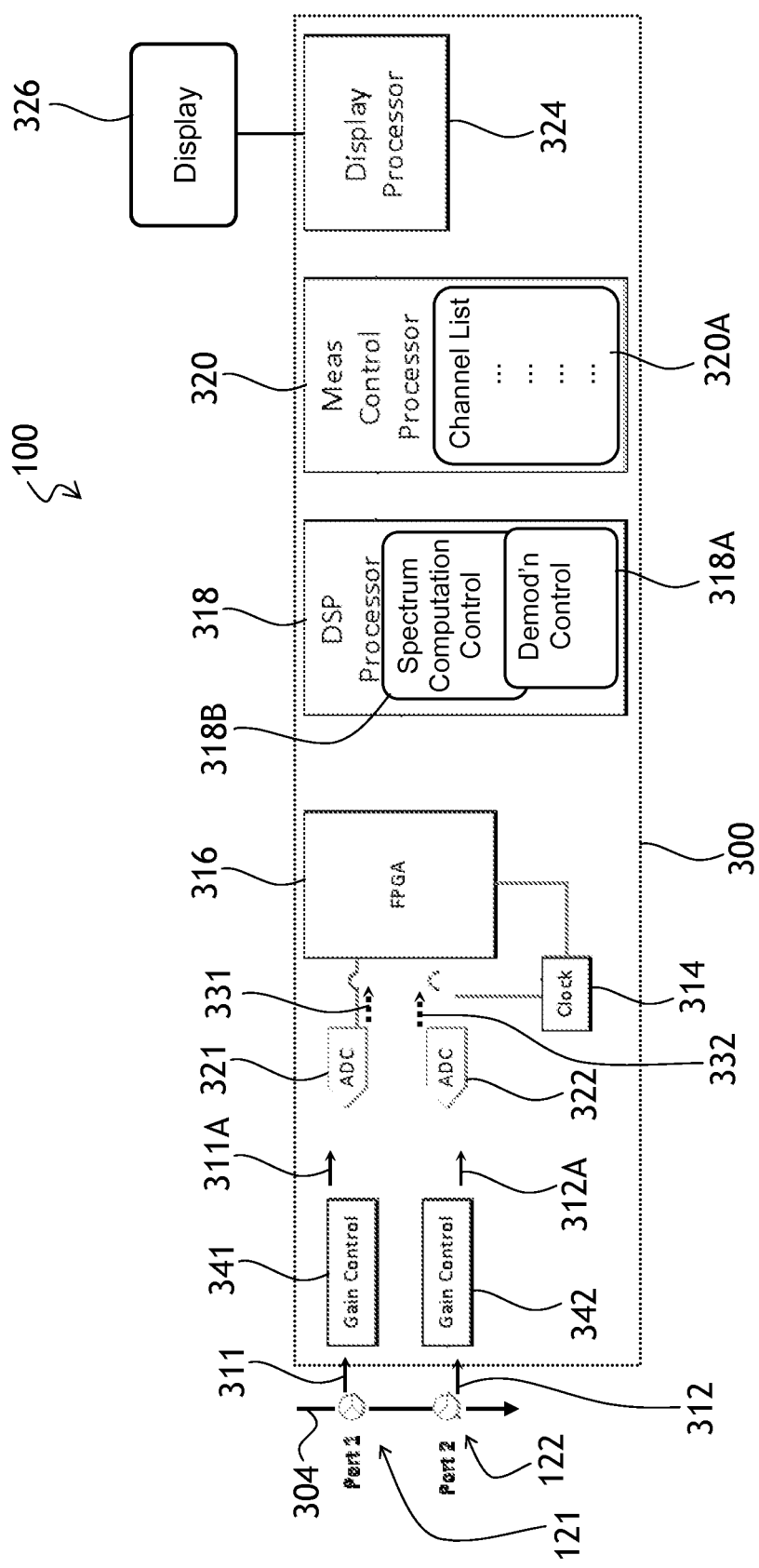
FIG. 3 illustrates an exemplary block diagram of the test instrument shown in FIG. 1.

An exemplary construction of the test apparatus 100 will now be described. Referring to FIG. 3, the test apparatus 100 may include the first 121 and second 122 RF input ports for coupling to the first 101 and second 102 test points, respectively, to obtain first 311 and second 312 signals, respectively, from a network signal 304 propagating across the first 101 and second 102 test points. The network signal 304 may include a first frequency channel including a first data packet, not shown. The first data packet may be a downstream or an upstream data packet. Other frequency channels, as well as undesired ingress noise, may be simultaneously present in the network signal 304.

A processor 300 of the test apparatus 100 may be communicatively coupled to the first 121 and second 122 RF input ports. The processor 300 may be configured for down-converting the first 311 and second 312 signals to select the first frequency channel in each one of the first 311 and second 312 signals, and for demodulating the first frequency channel in each down-converted signal, to select the first packet in each down-converted signal, and to obtain a parameter of demodulation of the first packet captured at each test point 101 and 102.

The parameter of demodulation may include modulation error ratio (MER), noise, ingress under carrier (IUC), and any other parameter or parameters representing quality of the signal, and/or quality of demodulation. This parameter is denoted as "first" demodulation parameter. Herein, terms "first", "second", and the like, used in reference to a packet, a frequency channel, etc., are not meant to denote an order in a succession of packets or channels. Instead, such terms are used merely for convenience, as an identifier of a packet or channel.

In the embodiment shown, the processor 300 may include first 321 and second 322 analog to digital converters (ADCs) coupled to the first 121 and second 122 RF input ports, respectively, for digitizing the first 311 and second 312 signals to obtain first 331 and second 332 digitized signals, respectively, and a clock 314 coupled to the first 321 and second 322 ADCs, for synchronous clocking of the latter.

The test apparatus 100 may include first 341 and second 342 gain control units coupled between the first RF input port 121 and the first ADC 321 and between the second RF input port 122 and the second ADC 322, respectively, for equalizing amplitudes of input signals 311A and 312A of the first and ADCs, respectively, for a better comparison of the first 311 and second 312 signals coupled to the respective RF input ports 121 and 122.

Figure 4:
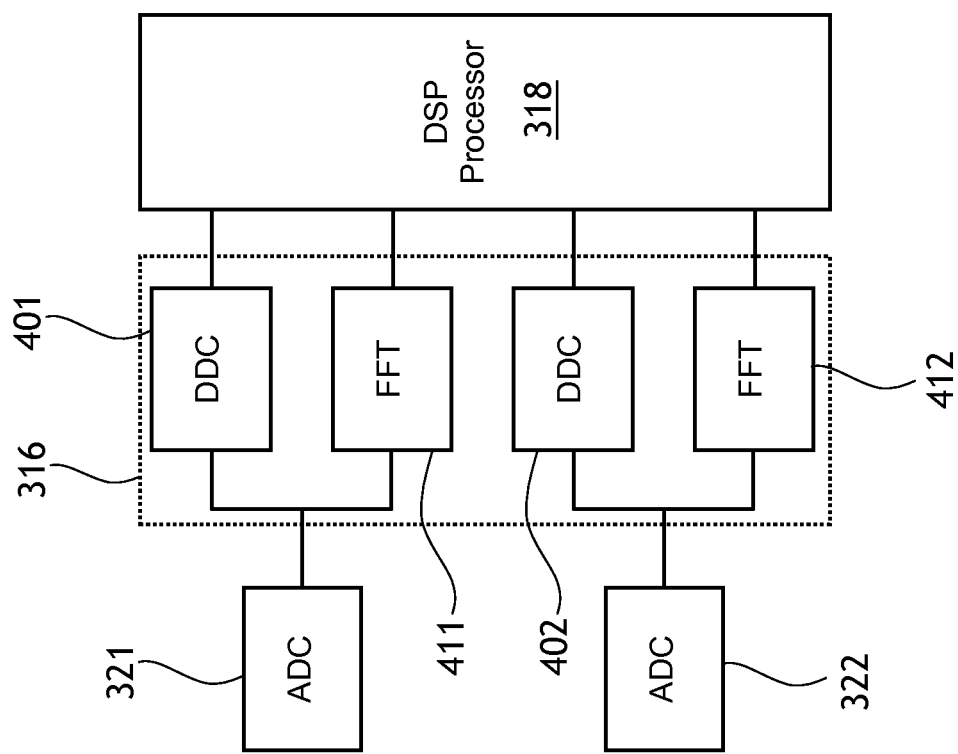
FIG. 4 illustrates an exemplary block diagram of a demodulation and spectrum computation circuitry of the test instrument of FIG. 3.

In the exemplary embodiment shown, the processor 300 may be configured for down-converting the first 331 and second 332 digitized signals to select the first frequency channel in each one of the first 331 and second 332 digitized signals. To that end, the processor 300 of the test apparatus 100 may include a field programmable gate array (FPGA) unit 316. The clock 314 is coupled to the FPGA unit 316 for clocking the FPGA unit 316. Turning to FIG. 4, the FPGA unit 316 may include a pair of digital down-converters 401 and 402 for selecting the first frequency channel in the first and second digitized signal 331 and 332, respectively, and a pair of spectrum computing units 411 and 412 for computing frequency spectra of the first 331 and second 332 digitized signals, respectively. In the exemplary embodiment shown, the spectrum computing units 411 and 412 may be configured to calculate frequency spectra by fast Fourier transform (FFT).

Still referring to FIGS. 3 and 4, the processor 300 may further include a DSP processing unit 318 coupled to the FPGA unit 316. The DSP processing unit 318 may be configured for demodulating the first frequency channel in each down-converted digitized signal 331 and 332. To that end, the DSP processing unit 318 may include a demodulation control module 318A. The DSP processing unit 318 may also include a spectrum computation control module 318B, for controlling the spectrum computing units 411 and 412 of the FPGA unit 316 (FIG. 4).

A measurement controller 320 may be communicatively coupled to the DSP processing unit 318, for controlling demodulation and spectra computation by the DSP processing unit 318 and the FPGA unit 316. The measurement controller 320 may keep track of available channels in the cable network 120, by maintaining a channel list 320A of channels to be tested.

A display processor 324 may be communicatively coupled to the measurement controller 320. A display device 326 may be communicatively coupled to the display processor 324. The display processor 324 may be configured for preparing data to be displayed, for example the frequency spectrum and the first demodulation parameter corresponding to each test point 101 and 102 (FIG. 1). It should be appreciated that the display device 326 may be optional because an external device, such as a handheld tablet computer, may be used to communicate with the test apparatus 100 e.g. via a Bluetooth™ link, and to display the test results including signal spectra, demodulation parameters, performance indices, etc. Also, it should be appreciated that the display device 326 may be configured to display the frequency spectra concurrently with the demodulation parameters for each test point 101 and

102. Thus, frequency spectra and demodulation parameters at the test points 101 and 102 may be directly compared to each other. Since the demodulation parameters relate to a same data packet, the test apparatus 100 may allow the comparison of the first 311 and second 312 signals received at the first 121 and second 122 RF input ports, respectively, to be performed on packet-by-packet basis. This configuration may be advantageously used to troubleshoot intermittent errors. For instance, the measurement control processor 320 of the testing apparatus 100 may be configured to only display results related to a packet having significant demodulation errors exceeding a pre-defined threshold. Thus, the results displayed in the display 326 may allow a user to perform comparison of demodulation errors at the first 101 and second 102 test points. If, for instance, the demodulation errors are similar, then the problem resides outside of a portion of a cable network transmission path between the first 101 and second 102 test points.

Figure 5:
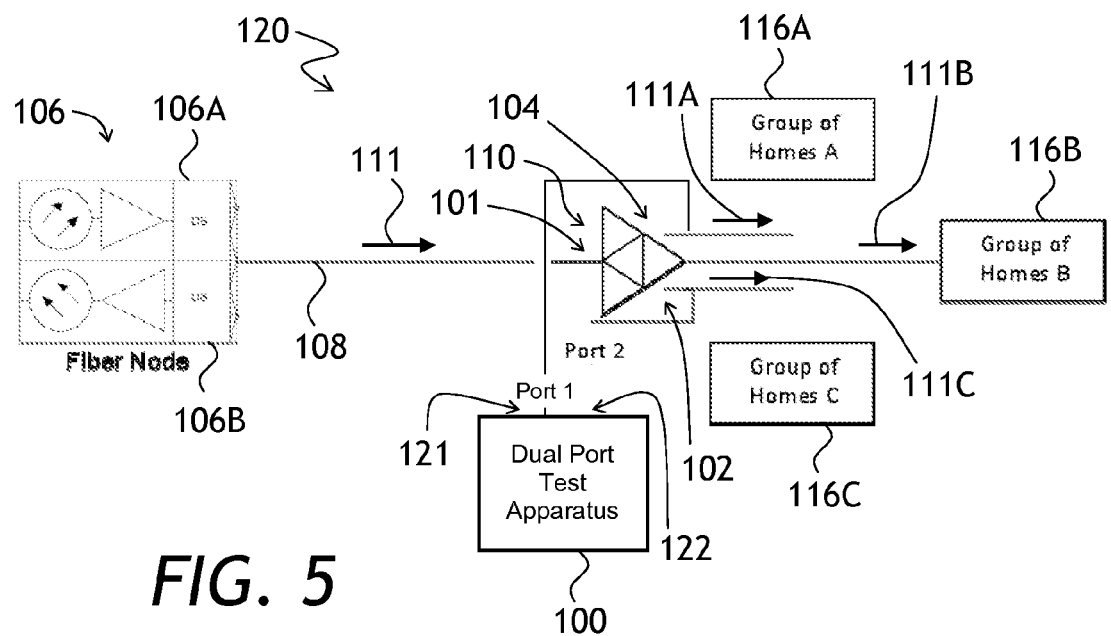
FIG. 5 illustrates an exemplary view of a cable network showing a test instrument of the invention connected to a pair of downstream legs of a bidirectional amplifier of the network.
Figure 6:
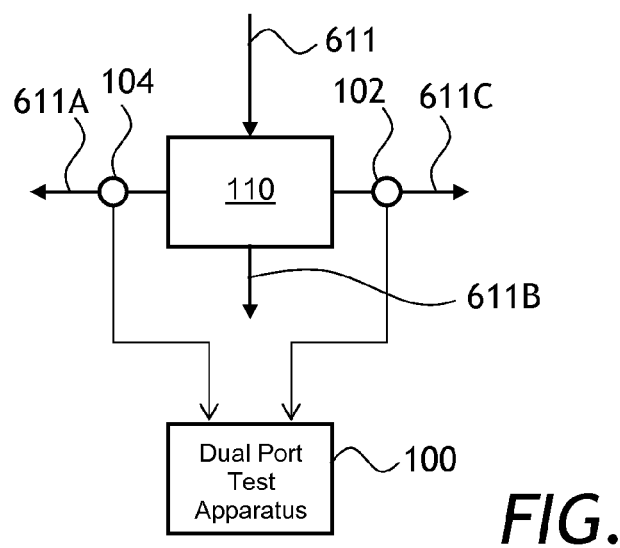
FIG. 6 illustrates an exemplary view of a network node being tested according to an alternative embodiment.

The test apparatus 100 may be used to test not only an upstream, but also a downstream signal path. Turning to FIG. 5, the test apparatus 100 may be connected to the test points 104 and 102 associated with the first group of homes 116A and the third group of homes 116C, respectively. The downstream signal 111 may be split into portions 111A, 111B, and 111C destined for the first 116A, the second 116B, and the third 116C groups of homes, respectively. The first 116A and third 116C portions may be sampled by the apparatus 100. Referring to FIG. 6, a noise signal 611 may be split into portions 611A, 611B, and 611C, that is, the noise signal 611 may propagate along the paths of the downstream signal 111. In this scenario, the detected demodulation and packet errors and the signal spectra obtained by the test apparatus 100 would be similar. If they are different, then a source of impairment may be likely located downstream of a leg corresponding to the largest demodulation errors, or the largest noise.

In one embodiment of a dual testing apparatus of the invention, the demodulation circuitry may be omitted, and the comparison may be based solely on synchronously captured spectra at a pair of spaced apart test points. Referring back to FIG. 3, the first 121 and second 122 RF input ports of such an apparatus may be coupled to first 321 and second 322 ADCs coupled to the first 121 and second 122 RF input ports, respectively, for synchronously digitizing signals coupled to the first 121 and second 122 RF input ports, respectively, to obtain the first 331 and second 332 digitized signals, respectively. In this particular embodiment, the processor 300 may be configured only for performing a spectral analysis of the first 331 and second 332 digitized signals, preferably via FFT, so as to obtain the first and second frequency spectra. The spectra may be displayed on the display device 326 for a visual comparison.

Figure 7:
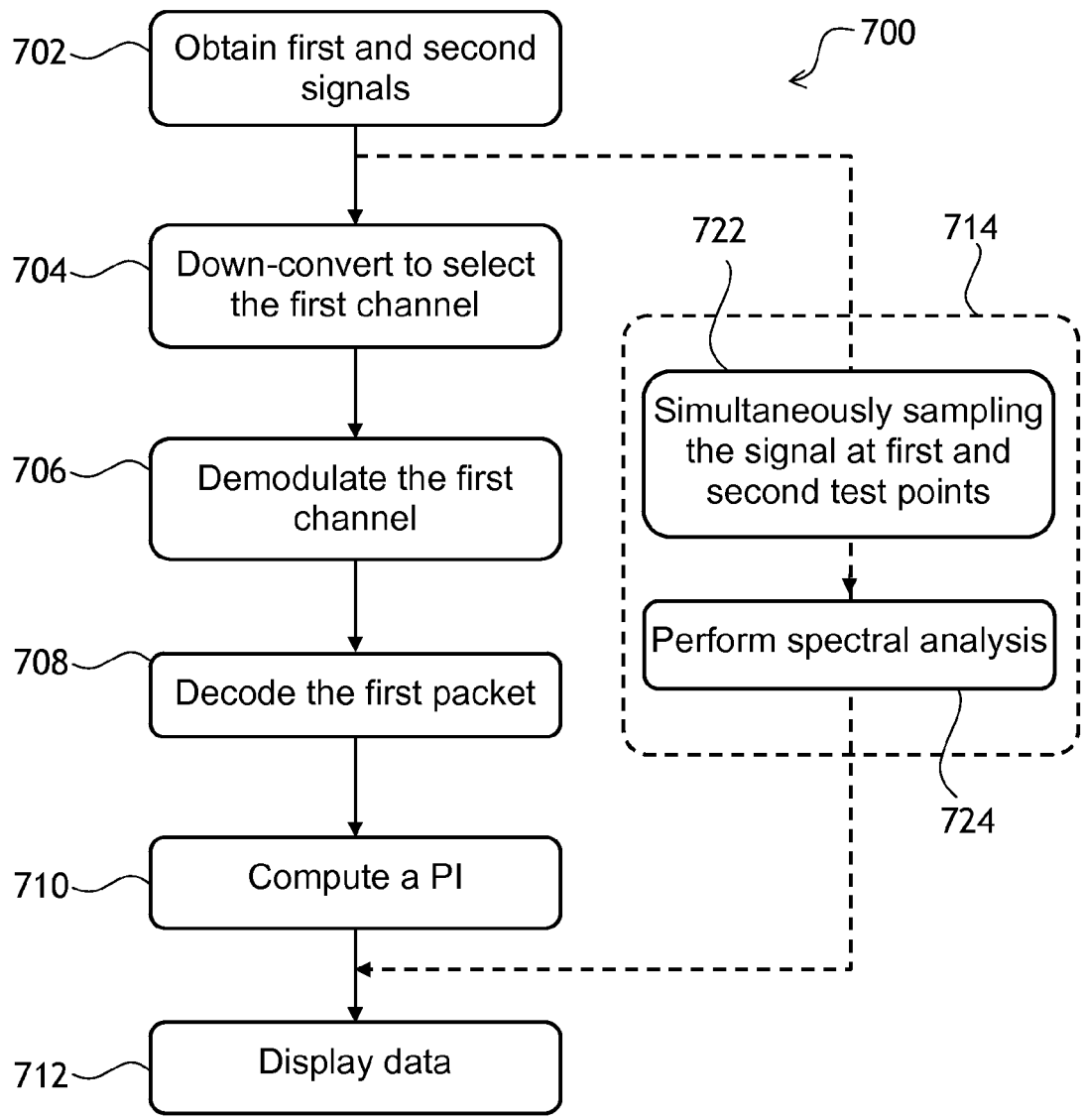
FIG. 7 illustrates an exemplary flow chart of a method for testing a cable network according to the invention.

Referring to FIG. 7 with further reference to FIGS. 1 and 3, a method 700 (FIG. 7) for testing a path of the network signal e.g. 304 (FIG. 3) in the network 120 using the test apparatus 100 (FIG. 1) may include a step 702 (FIG. 7) of obtaining the first 311 and second 312 signals from the network signal 304 propagating e.g. between the first 101 and second 102 test points (FIG. 1). In a step 704, the first and second signals may be down-converted, e.g. by the FPGA 316, to select the first frequency channel in each one of the first 121 and second 122 signals. In a step 706, the first frequency channel in each down-converted signal may be demodulated to select the first packet in each down-converted signal. Parameters of demodulation, such as MER, IUC, etc. may be collected in this step. The first demodulation parameter of the first packet may be collected at each test point 121 and 122. Then, in an optional step 708, the first packet may be decoded, and a first decoding parameter, such as a codeword or another decoding error, is obtained for each one of the first 101 and second 102 test points. Several demodulation and several decoding parameters of the first packet may be collected. In an optional step 710, a performance index (PI) may be computed based on a weighted sum of all collected demodulation and decoding parameters. Finally, in a step 712, the first demodulation and/or the first decoding parameter and/or PI corresponding to each test point may be displayed on the display 326, or on an external display (not shown).

The method 700 may be implemented in the processor 300 of the test apparatus 100. In particular, the processor 300 may be configured for computing a MER for each demodulated symbol of each first packet. The processor 300 may also be configured to obtain other demodulation and/or one or more decoding parameters of the first packet at each test point. The display processor 324 and the display device 326 may be configured to display the obtained demodulation and/or decoding parameters of the first packet for each test point, as well as graphs of the MER as a function of a demodulated symbol number, for each test point. Examples of such graphs are provided below.

In the method 700, the first 101 and second 102 test points may be disposed on the common and downstream legs of the amplifier 110. Such a configuration may allow one to trace propagation of upstream or downstream signal through the bidirectional amplifier 110. Alternatively, the common leg may be excluded, that is, the test points may be disposed as shown in FIG. 6. The latter configuration may be used for testing downstream signal paths.

Preferably, the signal obtaining step 702 may include simultaneously sampling the network signal 304 at the first 101 and second 102 test points, so as to obtain the first 331 and second 332 digitized signals. The simultaneous or clock-synchronized sampling may ensure that a same packet may be captured in nearly identical conditions of digital signal processing. In this embodiment, the down-converting step 704 may be performed digitally, that is, using the first 331 and second 332 digitized signals to select the first frequency channel in each one of the first 331 and second 332 digitized signals.

A step 714 of performing spectral analysis of the first 311 and second 312 signals may be performed independently from demodulation/decoding/PI computation steps 704 to 710. In one embodiment, the spectral analysis step 714 may include a step 722, in which the signal 304 is sampled simultaneously at the first 101 and second 102 test points, so as to obtain the first 331 and second 332 digitized signals. In a next step 724, the spectral analysis may be performed of the first 331 and second 332 digitized signals, so as to obtain first and second frequency spectra. Finally, in the displaying step 712, the first and second spectra may be displayed together, e.g. side by side, for a visual comparison. If the demodulation and decoding are performed on one packet or several consecutive packets, the corresponding demodulation/decoding parameters and/or PI for each test point and each packet may be displayed along with the frequency spectra.

To reduce a possibility of false differences between the first 121 and second 122 test points due to intermittent noise, the sampling step 724 may be achieved in a synchronous fashion, e.g. the ADCs 321 and 322 are synchronously clocked by the single clock 314 (FIG. 3). Also in the first step 722, the first 101 and second 102 test points may be disposed on legs of the bidirectional amplifier 110 including a combined leg. Alternatively, the combined leg may be excluded, that is, the test points may be disposed as shown in FIG. 6. Different test point combinations may be tried to determine which leg carries noisy or otherwise compromised signal. The analysis step 724 may include FFT. In the displaying step 712, the FFT spectra may be displayed in an overlapped fashion or side-by-side for ease of comparison. A differential spectrum may also be computed to highlight the differences between the two test points.

Figure 8A:
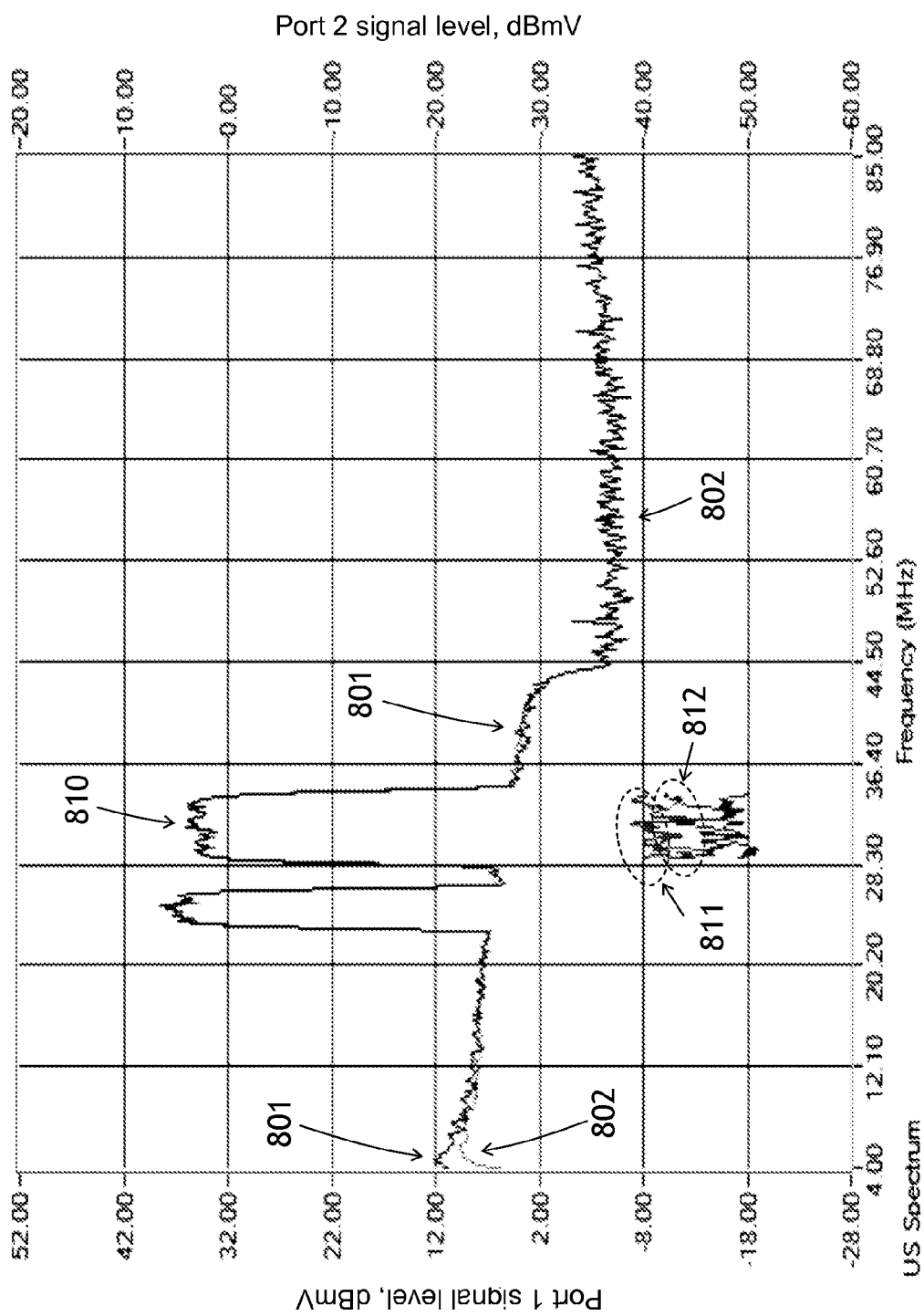
FIG. 8A shows a combined plot for frequency spectra and ingress under carrier (IUC) at first and second test points, showing similar noise floor levels.
Figure 8B:
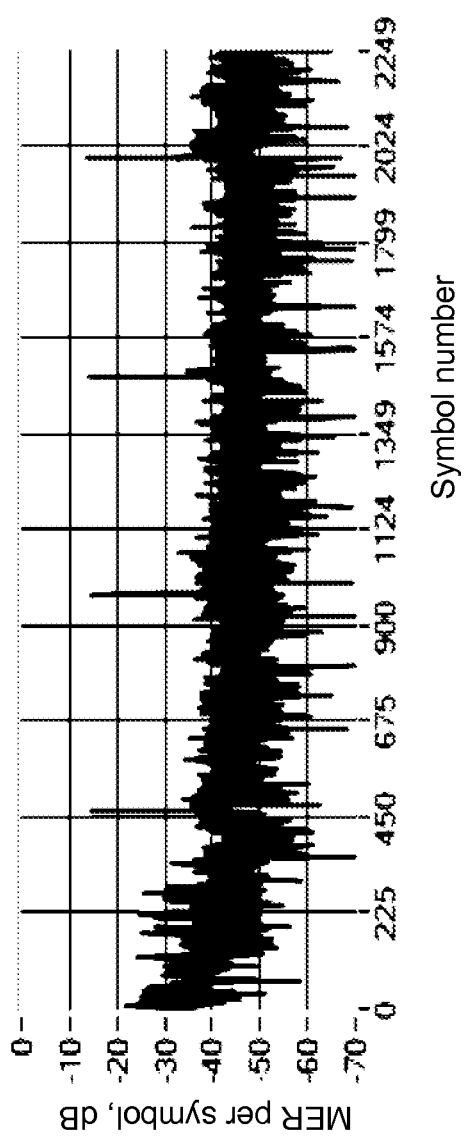
FIGS. 8B and 8C show plots of a logarithmic magnitude of an error vector per symbol as a function of symbol number at the first and second test points, respectively, used in computation of the IUC plots of FIG. 8A.
Figure 8C:
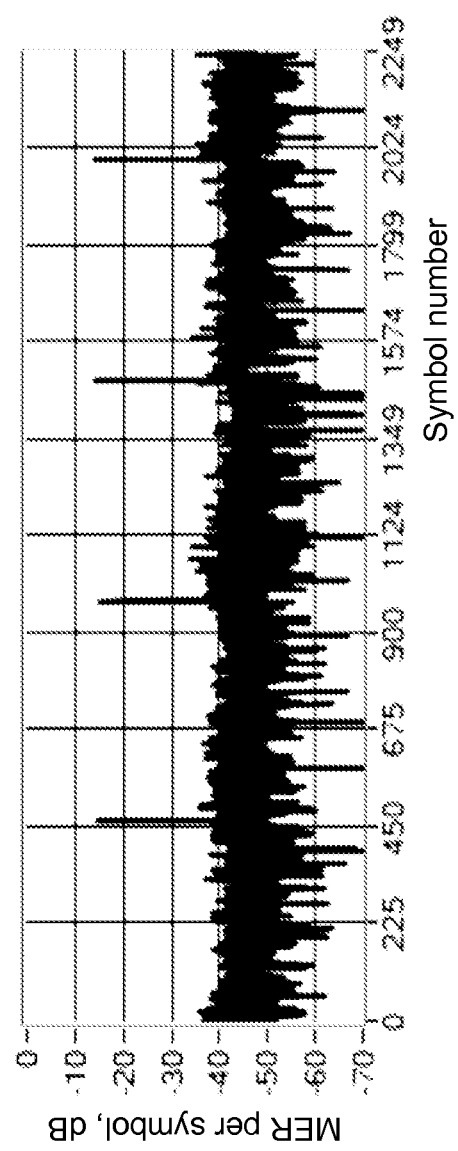
Figure 9A:
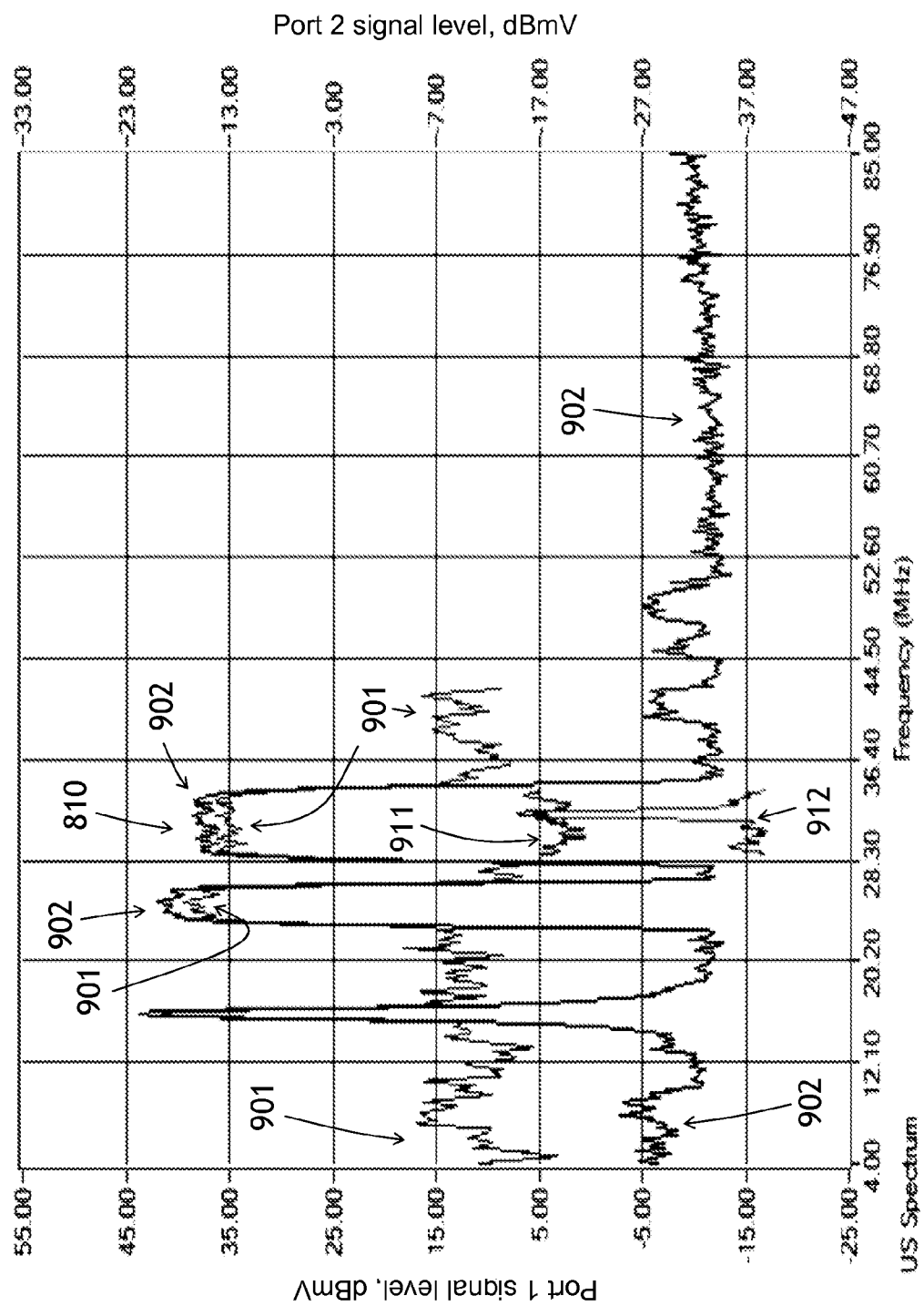
FIG. 9A shows a combined plot for frequency spectra and ingress under carrier (IUC) at first and second test points, showing dissimilar noise floor levels.
Figure 10:
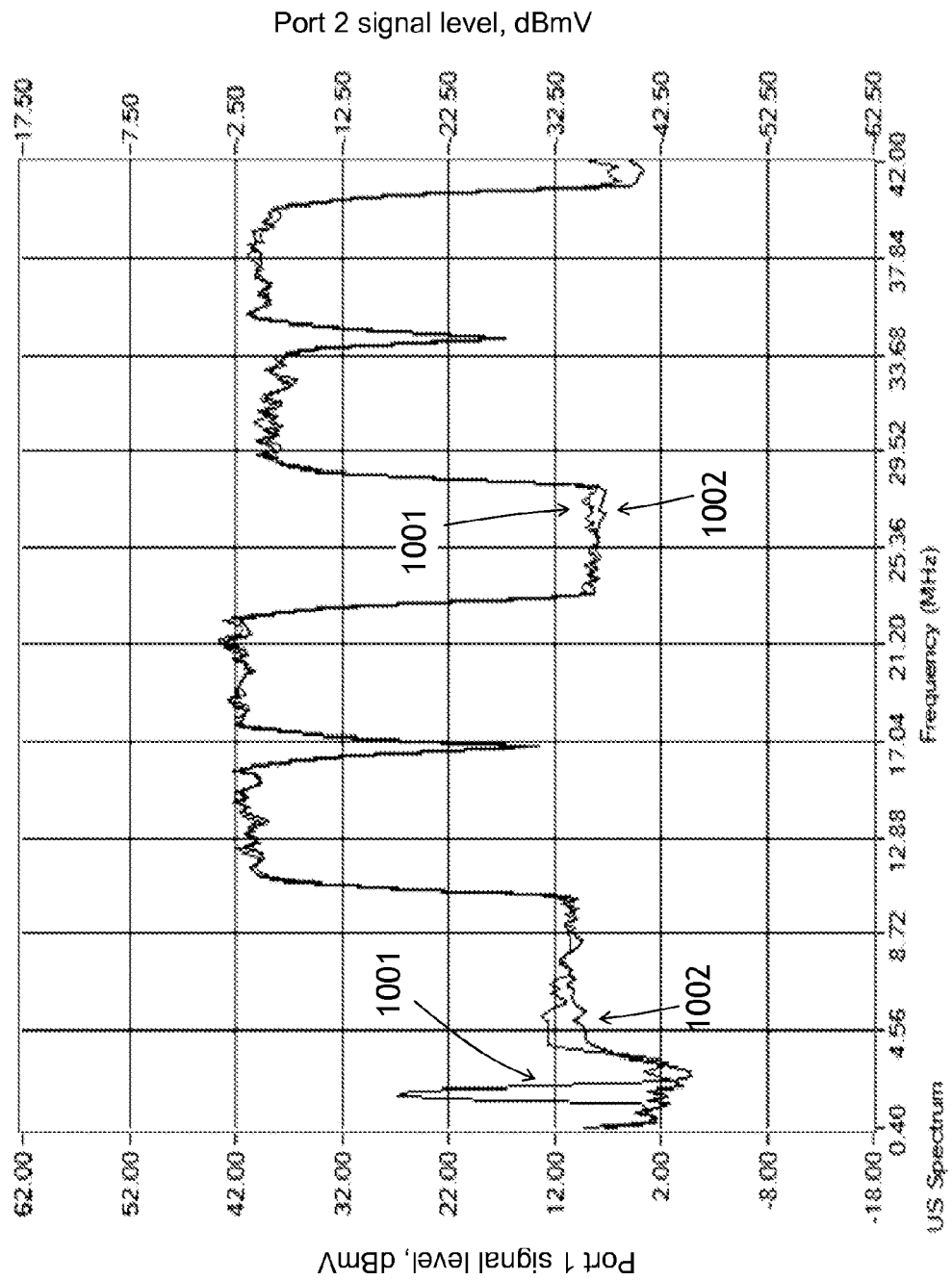
FIG. 10 shows a combined plot for frequency spectra taken for two faulty locations, one at headend, and one at a "combined" test point.
Figure 11:
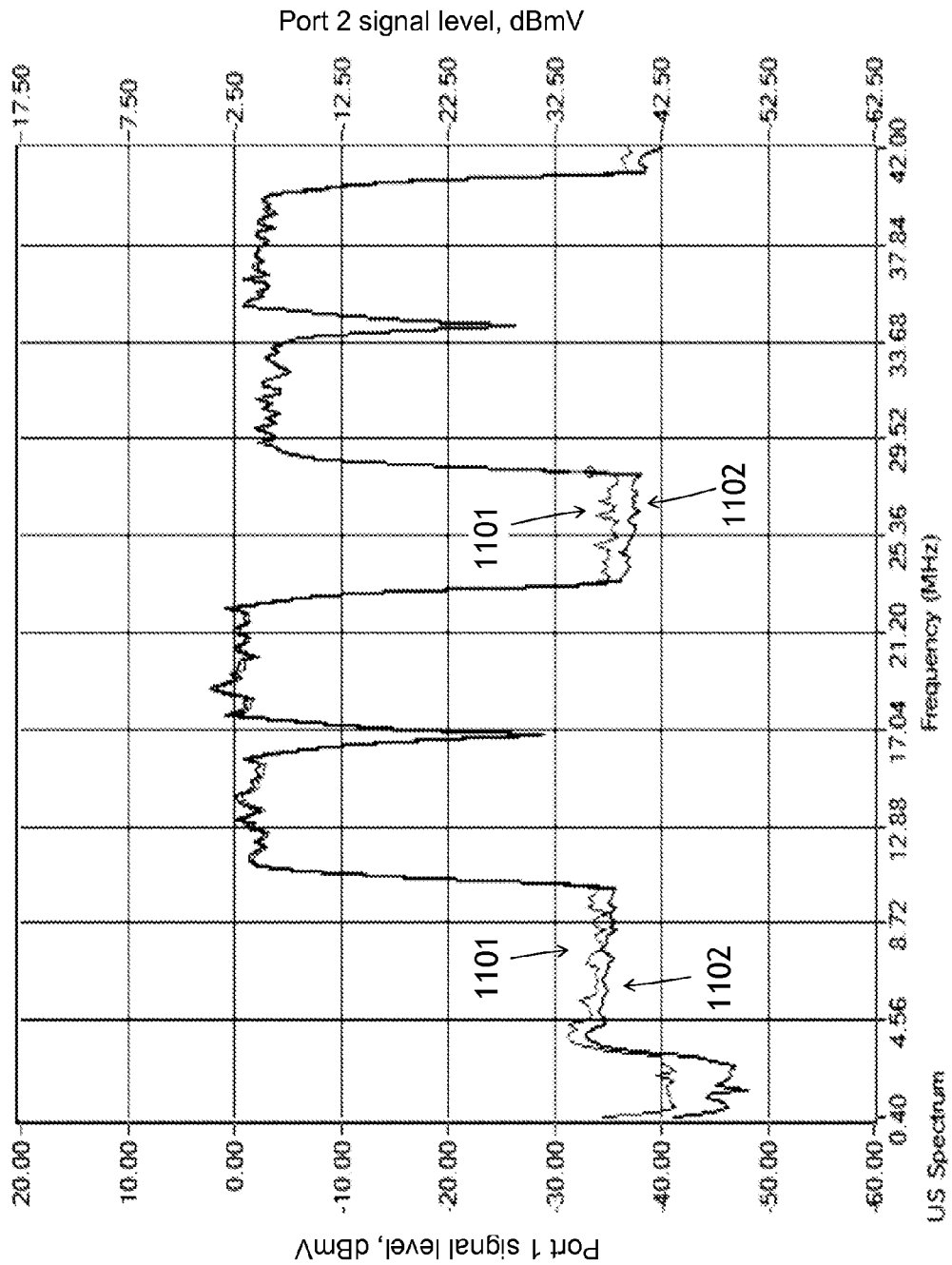
FIG. 11 shows a combined plot for frequency spectra taken for two faulty locations, one at headend, and one at a "faulty" leg of an amplifier.
Figure 12:
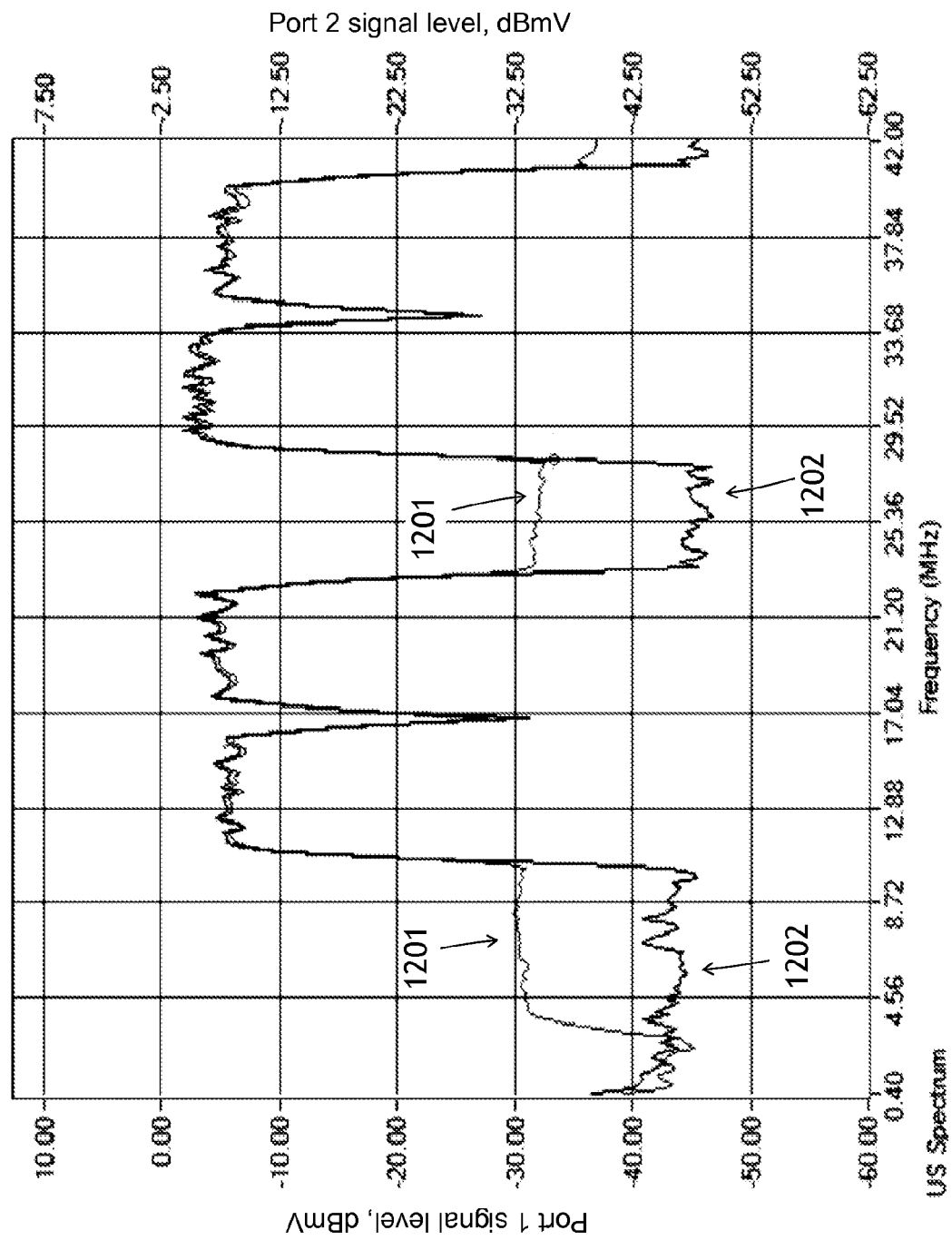
FIG. 12 shows a combined plot for frequency spectra taken for a faulty location and a "good" location: a "faulty" headend location and a "good" leg.

Network testing results using the apparatus 100 of FIGS. 1, 3, and 6, and the method 700 of FIG. 7 are presented in FIGS. 8A to 8C; 9A to 9C; and FIGS. 10 to 12. In FIGS. 8A, 9A, the spectra span from 4 MHz to 85 MHz; and in FIGS. 10 to 12, the spectra span from 4 MHz to 42 MHz. The amplitude scales on the left and on the right in dBmV correspond to logarithms of signal amplitudes at the first 121 and second 122 RF input ports of the apparatus 100 shown in FIGS. 1 and 3. The scales difference compensates for a difference in measured signal magnitudes at the first 121 and second 122 RF input ports.

The testing was performed using a test bed cable network system including a headend, the fiber node 106, the coaxial cable span 108, and the bidirectional amplifier 110 (FIG. 1). All the equipment was collocated for testing purposes. In a first test, the first test location was at the headend, and the second test location corresponded to the second test point 102. Referring specifically to FIG. 8A, upstream band frequency spectra 801 and 802 of the first and second signals 311 and 312 (FIG. 3) are shown for a case when the two locations show similar performance. In FIG. 8A, the spectra 801 and 802 are almost identical.

Referring to FIGS. 8B and 8C, an error vector per symbol is plotted in dB units as a function of symbol number in the first packet of the first signal 311 (FIG. 8B) and the second signal 312 (FIG. 8C). The similarity of graphs of FIGS. 8B and 8C indicates that the signal quality of the first and second signals 311 and 312 is similar. Referring back to FIG. 8A, ingress under carrier (IUC) in the first frequency channel denoted at 810 is plotted for the first 311 and second 312 signals at 811 and 812, respectively. The IUC plots 811 and 812 in the first frequency channel 810 are obtained by taking Fourier transforms of the corresponding error vector data shown in FIGS. 8B and 8C, respectively. The conclusion of similarity of the signal quality of the first and second signals 311 and 312 is corroborated by the similarity of IUC plots 811 and 812, indicating that a potential impairment source is not located in a path between the second test point 102 and the headend.

Figure 9B:
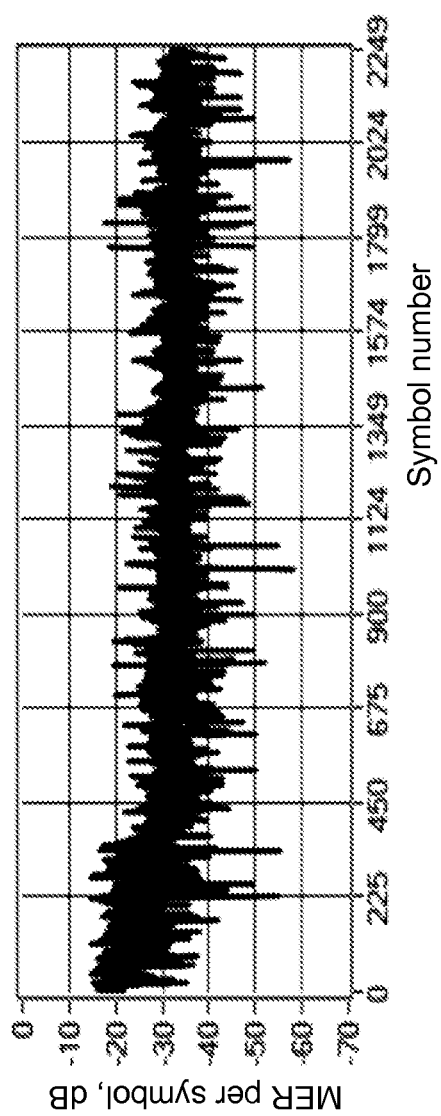
FIGS. 9B and 9C show logarithmic plots of error vector vs. symbol number at the first and second test points, respectively, used in computation of the IUC plots of FIG. 9A.
Figure 9C:
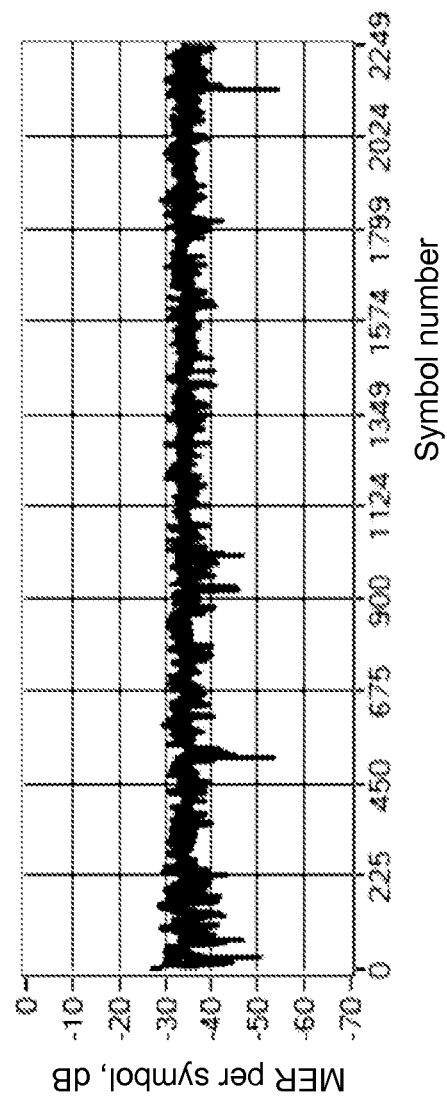

Turning to FIG. 9A, upstream band frequency spectra 901 and 902 of the first and second signals 311 and 312 (FIG. 3) illustrate a case where the signal quality at the two simultaneously measured locations, one at the headend, and one at the third test point 103 (FIG. 1), is different. Specifically, the first spectrum 901, measured at the headend, shows a much higher noise floor between 4 MHz and 12 MHz and around 20 MHz than the second spectrum 902, measured at the third test point 103. First 911 and second 912 IUC plots in the first frequency channel 810 for the first 311 and second 312 signals, respectively, also show a remarkable difference. The first IUC plot 911 show much higher levels of noise than the second IUC plot 912 only peaking at a single frequency. This indicates that the impairment was not present at the test point 103, originating somewhere upstream of the third test point 103 towards the headend. In this case, the impairment was actually caused by the upstream signal level originating at the test point 103 being too high, and causing oversaturation of laser at the upstream electro-optic converter 106B (FIG. 1). Referring to FIGS. 9B and 9C, the MER is also remarkably different for the two test points.

Turning to FIG. 10 with further reference to FIG. 1, a headend upstream frequency spectrum 1001 (FIG. 10) is plotted together with an upstream frequency spectrum 1002 measured at the first test point 101, corresponding to the combined leg of the amplifier 110 (FIG. 1). The spectra 1001 and 1002 are very similar. Demodulation and decoding of a same upstream packet was performed for both signals according to the method 700 of FIG. 7, and a performance index (PI) was calculated based on a weighted sum of the corresponding demodulation and decoding parameters. The PI varies from 0 (no signal) to 100 (a perfect signal). For both spectra 1001 and 1002, the PI was equal to 65, indicating a somewhat compromised performance.

Referring to FIG. 11 with further reference to FIG. 1, a headend upstream frequency spectrum 1101 (FIG. 11) is plotted together with an upstream frequency spectrum 1102 measured at the second test point 102, corresponding to an "impaired" leg of the amplifier 110 (FIG. 1). The spectra 1101 and 1102 are again very similar, indicating that the performance is still compromised on that leg. The PI calculations for both test points resulted in a same value of 66, confirming this conclusion.

Turning now to FIG. 12 with further reference to FIG. 1, a headend upstream frequency spectrum 1201 (FIG. 12) is plotted together with an upstream frequency spectrum 1202 measured at the third test point 103, corresponding to a "good" leg of the amplifier 110 (FIG. 1). The spectra 1201 and 1202 are markedly different: while the first spectrum 1201, corresponding to the headend test point, has a relatively high noise floor, the second spectrum is much less noisy. The PI calculations confirmed this conclusion, having yielded the values of 68 and 98 for the headend test point and the third test point 103, respectively. The graphs 801, 802 of FIG. 8A; 901, 902 of FIG. 9A; 1001, 1002 of FIG. 10; 1101, 1102 of FIG. 11; and 1201, 1202 of FIG. 12, as well as the MER plots of FIGS. 8B, 8C and 9B, 9C, were displayed on the display device 326 of the test apparatus 100 along with the corresponding PI values. Based on these graphical data, a technician may determine a noise origin.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for testing a path of a network signal in a cable network, the path comprising a first test point and a second test point spaced part from one another, the network signal comprising a first frequency channel comprising a first data packet, the apparatus comprising:
- a first RF input port configured to electrically couple to the first test point to obtain a first signal from the network signal propagating in the cable network across the first test point;
- a second RF input port configured to electrically couple to the second test point to obtain a second signal from the network signal propagating in the cable network across the second test point; and
- a processor communicatively coupled to the first RF input port and the second RF input port, and configured to:
    - down-convert the first signal and the second signal to select the first frequency channel in each one of the first signal and the second signal;
    - demodulate the first frequency channel in each down-converted signal to select the first packet in each down-converted signal, wherein
        - the demodulation includes computation of a first demodulation parameter of the first packet at each test point, and
        - the first demodulation parameter includes a modulation error ratio for each demodulated symbol of each first packet; and
    - provide, for display, information indicating the modulation error ratio as a function of a demodulated symbol number for each test point.

2. The apparatus of claim 1, wherein the processor comprises a first analog to digital converter coupled to the first RF input port configured to digitize the first signal to obtain a first digitized signal, and a second analog to digital converter coupled to the second RF input port configured to digitize the second signal to obtain a second digitized signal, and a clock coupled to the first analog to digital converter and the second analog to digital converter, for synchronous clocking thereof;
- wherein the processor is configured to down-convert the first digitized signal and the second digitized signal to select the first frequency channel in each one of the first digitized signal and the second digitized signal.

3. The apparatus of claim 2, further comprising a first gain control unit coupled between the first RF input port and the first analog to digital converter, and a second gain control unit coupled between the second RF input port and the second analog to digital converter, configured to equalize amplitudes of input signals of the first analog to digital converter and the second analog to digital converter.

4. The apparatus of claim 1, further comprising a display device, communicatively coupled to the processor, configured to display the first demodulation parameter corresponding to each test point.

5. The apparatus of claim 4, wherein the processor comprises a digital downconverter configured to select the first frequency channel in each of the first signal and the second signal, and a spectrum computing unit configured to compute frequency spectra of each of the first signal and the second signal; and
- wherein the display device is configured to display the frequency spectra concurrently with the first demodulation parameter for each test point.

6. The apparatus of claim 5, wherein the processor comprises:
- an FPGA unit having implemented therein the digital downconverter and the spectrum computing unit, wherein a clock is coupled to the FPGA unit and configured to clock the FPGA unit;
- a DSP processing unit coupled to the FPGA unit, wherein the DSP processing unit is configured to demodulate the first frequency channel in each down-converted signal;
- a measurement controller, coupled to the DSP processing unit, configured to control demodulation and spectra computation by the DSP processing unit and the FPGA unit; and
- a display processor, coupled to the measurement controller and the display device, configured to prepare data to be displayed by the display device, wherein the data comprises the frequency spectra corresponding to each test point and the first demodulation parameter corresponding to each test point.

7. The apparatus of claim 1, further comprising:
- a display configured to display graphs of the modulation error ratio as the function of the demodulated symbol number for each test point.

8. The apparatus of claim 1, wherein the processor is further configured to decode the first packet received at each test point, to obtain a first decoding parameter of the first packet at each test point; and wherein a display is configured to display the first decoding parameter of the first packet for each test point.

9. The apparatus of claim 8, wherein the processor is further configured to obtain a plurality of demodulation parameters at each test point, the plurality of demodulation parameters comprising the first demodulation parameter, and a plurality of decoding parameters at each test point, the plurality of decoding parameters comprising the first decoding parameter,
- wherein the processor is further configured to compute, for each test point, a performance index from a weighted sum of corresponding demodulation parameters and decoding parameters; and
- wherein the display is configured to display the performance index of the first packet for each test point.

10. The apparatus of claim 1, where the processor, when demodulating, is configured to:
- compute a second demodulation parameter of the first packet,
    - the second demodulation parameter including at least one of a noise or an ingress under carrier.

11. An apparatus for testing a path of a network signal in a cable network, the path comprising a first test point and a second test point spaced apart from one another, the apparatus comprising:
- a first RF input port configured to electrically couple to the first test point to obtain a first signal from the network signal propagating in the cable network across the first test point;
- a second RF input port configured to electrically couple to the second test point to obtain a second signal from the network signal propagating in the cable network across the second test point;
- a first analog to digital converter and a second analog to digital converter coupled to the first RF input port and the second RF input port, respectively, configured to synchronously digitize the signal coupled to the first RF input port and the second RF input port, respectively, to obtain a first digitized signal and a second digitized signal, respectively;
- a processor configured to perform a spectral analysis of the first digitized signal and the second digitized signal, wherein the performance of the spectral analysis includes computation of a modulation error ratio for each demodulated symbol of a first packet included in each of the first digitized signal and the second digitized signal and performing fast Fourier transform (FFT) of functions of the modulation error ratio versus demodulated symbol number so as to obtain frequency spectra of ingress under carrier in each first packet; and a display device configured to display information indicating the frequency spectra of ingress under carrier for each test point.

12. A method for testing a path of a network signal in a cable network, the path comprising a first test point and a second test point spaced apart from one another, the network signal comprising a first frequency channel comprising a first data packet, the method comprising:

electrically coupling to the first test point and obtaining a first signal from the network signal propagating in the cable network across the first test point;

electrically coupling to the second test point and obtaining a second signal from the network signal propagating in the cable network across the second test point;

down-converting the first signal and the second signal to select the first frequency channel in each one of the first signal and the second signal;

demodulating the first frequency channel in each down-converted signal to select the first packet in each down-converted signal, and obtaining demodulation parameters of the first packet at each test point;

upon completion of demodulation of the first frequency channel in each down-converted signal, decoding the first packet at each of the first test point and the second test point, the decoding including obtaining decoding parameters at each test point;

upon completion of the decoding, computing, for each test point, a performance index from a weighted sum of corresponding demodulation parameters and decoding parameters; and displaying the performance index of the first packet for each test point.

13. The method of claim 12, wherein the first signal and the second signal are obtained by simultaneously sampling the network signal at the first test point and the second test point, so as to obtain the first signal and the second signal, and wherein the down-converting is performed digitally, so as to select the first frequency channel in each one of the first signal and the second signal.

14. The method of claim 12, wherein the demodulating comprises computing a modulation error ratio for each demodulated symbol of each first packet, the method further comprising displaying graphs of the modulation error ratio as a function of a demodulated symbol number, for each test point.

15. The method if claim 12, wherein the demodulating comprises computing a modulation error ratio for each demodulated symbol of each first packet, and performing fast Fourier transform (FFT) of functions of the modulation error ratio versus demodulated symbol number, so as to obtain frequency spectra of ingress under carrier in each first packet, the method further comprising:

displaying the frequency spectra of ingress under carrier for each test point.

16. The method of claim 12, wherein, the first test point and the second test point are disposed on a first leg and a second leg of an amplifier, comprising a combined leg of the amplifier.

17. The method of claim 12, where the demodulation parameters include at least one of a modulation error ratio, a noise, or an ingress under carrier.

18. The method of claim 12, where the demodulation parameters include a modulation error ratio and an ingress under carrier.

19. A method for testing a path of a network signal in a cable network, the path comprising a first test point and a second test point spaced apart from one another, the method comprising:

electrically coupling to the first test point and the second test point to simultaneously sample the network signal at the first test point and the second test point to obtain a first digitized signal and a second digitized signal;

performing a spectral analysis of the first digitized signal and the second digitized signal, performing the spectral analysis including computing a modulation error ratio for each demodulated symbol of a first packet included in each of the first digitized signal and the second digitized signal and performing fast Fourier transform (FFT) of functions of the modulation error ratio versus demodulated symbol number so as to obtain frequency spectra of ingress under carrier in each first packet; and displaying information indicating the frequency spectra of ingress under carrier for each test point.

20. The method of claim 19, wherein during the simultaneous sampling, the first test point and the second test point are disposed on legs of an amplifier, excluding a combined leg of the amplifier.

* * * * *